US006938929B2

(12) United States Patent
Cicansky

(10) Patent No.: US 6,938,929 B2
(45) Date of Patent: Sep. 6, 2005

(54) VEHICLE MUD FLAP

(75) Inventor: Joseph Cicansky, Regina (CA)

(73) Assignee: Cloud-Rider Designs, Regina (CA)

( * ) Notice: Subject to any disclaimer, the term of this patent is extended or adjusted under 35 U.S.C. 154(b) by 59 days.

(21) Appl. No.: 10/287,651

(22) Filed: Nov. 5, 2002

(65) Prior Publication Data

US 2003/0116957 A1 Jun. 26, 2003

Related U.S. Application Data

(63) Continuation-in-part of application No. 10/025,619, filed on Dec. 26, 2001, now Pat. No. 6,729,652.

(30) Foreign Application Priority Data

Dec. 21, 2001 (CA) ............................................ 2366081

(51) Int. Cl.[7] .............................................. B62D 25/16
(52) U.S. Cl. ...................... 280/848; 280/847; 280/851; 280/154; 280/152.3
(58) Field of Search ................................ 280/848, 847, 280/850, 851, 849, 154, 155, 156, 157, 152.05, 152.3

(56) References Cited

U.S. PATENT DOCUMENTS

| 3,051,508 A | | 8/1962 | Federspiel |
| 3,237,963 A | * | 3/1966 | Menzer ....................... 280/851 |
| 3,241,857 A | * | 3/1966 | Goetz ......................... 280/851 |
| 3,279,818 A | * | 10/1966 | Jones ......................... 280/851 |
| 3,285,624 A | * | 11/1966 | Aber et al. .................. 280/851 |
| 3,473,825 A | | 10/1969 | Ochs |
| 3,497,238 A | * | 2/1970 | Carlton ....................... 280/851 |
| 4,382,606 A | | 5/1983 | Lightle et al. |
| 4,709,938 A | * | 12/1987 | Ward et al. .................. 280/851 |
| 4,796,906 A | | 1/1989 | Sullivan |
| 5,050,908 A | | 9/1991 | Betts |
| 5,273,318 A | * | 12/1993 | Nakayama et al. ......... 280/851 |
| 5,326,135 A | | 7/1994 | Nakayama et al. |
| 5,833,283 A | * | 11/1998 | Shaw ......................... 293/117 |
| 6,013,351 A | * | 1/2000 | Mahn, Jr. ................. 428/195.1 |
| 6,152,469 A | | 11/2000 | Gadowski |
| 2002/0043797 A1 | * | 4/2002 | Cicansky .................... 280/847 |
| 2002/0074790 A1 | | 6/2002 | Heem |
| 2002/0109347 A1 | | 8/2002 | Sheppard |
| 2003/0116957 A1 | * | 6/2003 | Cicansky .................... 280/848 |
| 2003/0151243 A1 | * | 8/2003 | Horinek ..................... 280/848 |

FOREIGN PATENT DOCUMENTS

| CA | 1275131 | 10/1990 | |
| CA | 2114126 | 2/1993 | |
| EP | 0001902 | 5/1979 | |
| EP | 0112694 | 7/1984 | |
| GB | 0058508 A1 * | 8/1982 | ........... B62D/25/18 |

OTHER PUBLICATIONS

TruckToys4Less. Com website for Automotive Accessories for Trucks, Vans and SUV's.*

* cited by examiner

*Primary Examiner*—J. Allen Shriver
(74) *Attorney, Agent, or Firm*—Ryan W. Dupuis; Adrian D. Battison; Michael R. Williams

(57) ABSTRACT

A mud flap is provided for a vehicle which comprises a panel member of rubber having a top mounting end for securement within the wheel well of a vehicle, a bottom free end having a metallic accent plate supported thereon and respective inner and outer sides extending between the ends of the panel member. A recessed portion in the panel member received the accent plate therein and includes a peripheral lip to overlap the peripheral edges of the accent plate. The use of a peripheral lip which overlaps a peripheral edge of the accent plate prevents separation of the plate from the panel member when the panel member is deformed by wind and debris in use. Accordingly dirt and debris are not permitted to be lodged between the plate and the panel member, thus preventing deformation and an unattractive appearance to the mud flap.

17 Claims, 6 Drawing Sheets

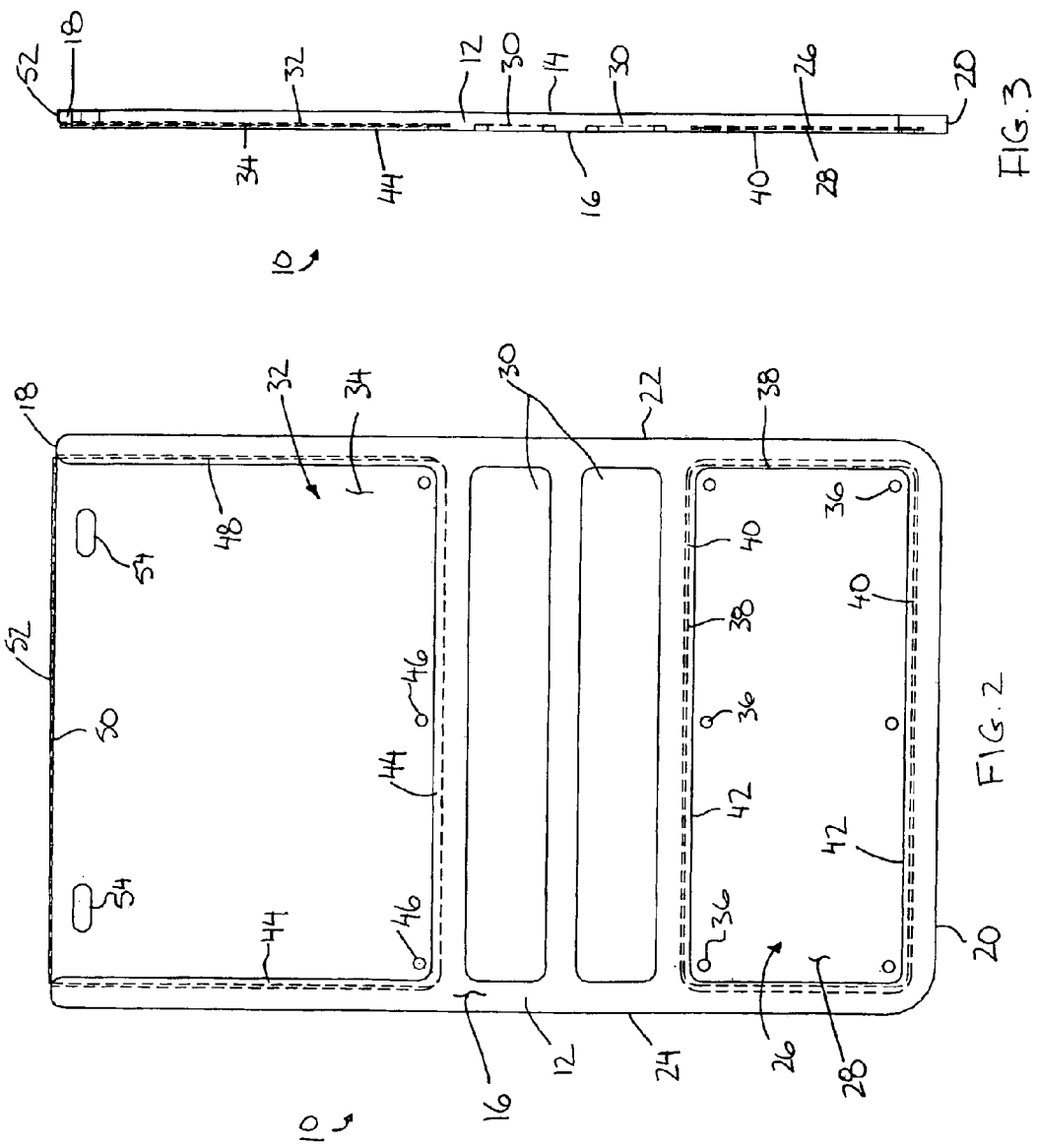

VEHICLE MUD FLAP

This application is a Continuation-in-Part Application of application Ser. No. 10/025,619, filed Dec. 26, 2001 now U.S. Pat. No. 6,729,652 and claims priority under 35 U.S.C. 119(a)–(d) or (f).

FIELD OF THE INVENTION

The present invention relates to a mud flap and more particularly to a mud flap having a decorative metallic insert.

BACKGROUND

For decorative appearance, a metallic insert is known to be located on various designs of vehicle mud flaps. When supporting a mud flap on a vehicle however, the mud flaps are known to be subjected to significant abuse due to rocks and other debris being thrown from the wheels onto the mud flaps. Typically the decorative metallic insert on known mud flaps, merely lays flat against the panel forming the body of the mud flap to be secured by various types of fasteners. The resulting twisting of the mud flap and debris being thrown about in use however, causes the metallic insert to partly separate from the panel of the mud flap so that dirt and debris can be lodged between the metallic insert and the panel. The debris accordingly causes deformation of the mud flap and an undesirable appearance results.

SUMMARY

According to the present invention there is provided a mud flap for a vehicle comprising:

a panel member having front and rear surfaces bounded by a top mounting end, a bottom free end and respective inner and outer sides extending between the ends, the rear surface including a recessed portion therein;

mounting means for securing the top mounting end of the panel member to the vehicle; and a metallic accent plate received within the recessed portion of the rear surface of the panel member;

the recessed portion including a peripheral lip which extends at least partway about a periphery of the recessed portion and which overlaps a peripheral edge of the accent plate.

The use of a peripheral lip which overlaps a peripheral edge of the accent plate prevents separation of the plate from the panel member when the panel member is deformed by road debris in use. Accordingly dirt and debris are not permitted to be lodged between the plate and the panel member, thus preventing deformation and a resulting unattractive appearance to the mud flap.

Preferably, the peripheral lip extends fully about the periphery of the recessed portion and overlaps the edge of the accent plate about a full periphery thereof.

The peripheral lip is preferably formed of stretchable resilient material so that an opening of the recessed portion bound by the peripheral lip may be smaller in an unstretched position than the dimensions of the accent plate, while still permitting the accent plate to be inserted therethrough.

Preferably, the accent plate is smaller in dimension than the recessed portion with the peripheral lip removed such that the peripheral edge of the accent plate is spaced inwardly from the periphery of the recessed portion while both the accent plate and the space between the plate and recessed portion periphery are overlapped by the lip.

The peripheral lip may project inwardly from the periphery of the recessed portion a distance between $1/8$ of an inch and $5/16$ of an inch, but ideally projects inwardly approximately $3/16$ of an inch.

In the preferred embodiment, the recessed portion is located adjacent the bottom end of the panel member.

When there is provided a plurality of fasteners securing the accent plate to the panel member, the fasteners are preferably located adjacent the peripheral edge of the accent plate, spaced inwardly from the overlapping peripheral lip.

The fasteners and the accent plate are preferably formed of a similar grade of stainless steel to prevent corrosion.

The mounting means may comprise a pair of elongated slots in the panel member adjacent the top mounting end of the panel member.

There may be provided a pair of metallic accent plates spaced apart along the bottom free end of the panel member, each supported within a respective recessed portion of the panel member and each being overlapped by a respective peripheral lip of the recessed portion.

The panel member preferably includes a mounting portion recessed into the rear surface adjacent the top mounting end which receives a mounting plate therein similarly to the accent plate.

The mounting portion preferably includes a peripheral lip which extends at least partway about a periphery of the mounting portion and which overlaps a peripheral edge of the mounting plate.

The mounting portion may be open along the top mounting end of the panel member for slidably receiving the mounting plate into the mounting portion of the panel member in a longitudinal direction of the panel member.

When the mounting portion extends up to the top mounting end, the mounting plate may include a flange portion extending rearwardly from a top edge of a main body of the mounting plate which overlaps the top mounting end of the panel member. The flange portion preferably lies generally perpendicularly to the main body of the mounting plate.

BRIEF DESCRIPTION OF THE DRAWINGS

In the accompanying drawings, which illustrate exemplary embodiments of the present invention:

FIGS. 2 and 3 are front elevational and side elevational view of the mud flap according to FIG. 1.

DETAILED DESCRIPTION

Figure 1:
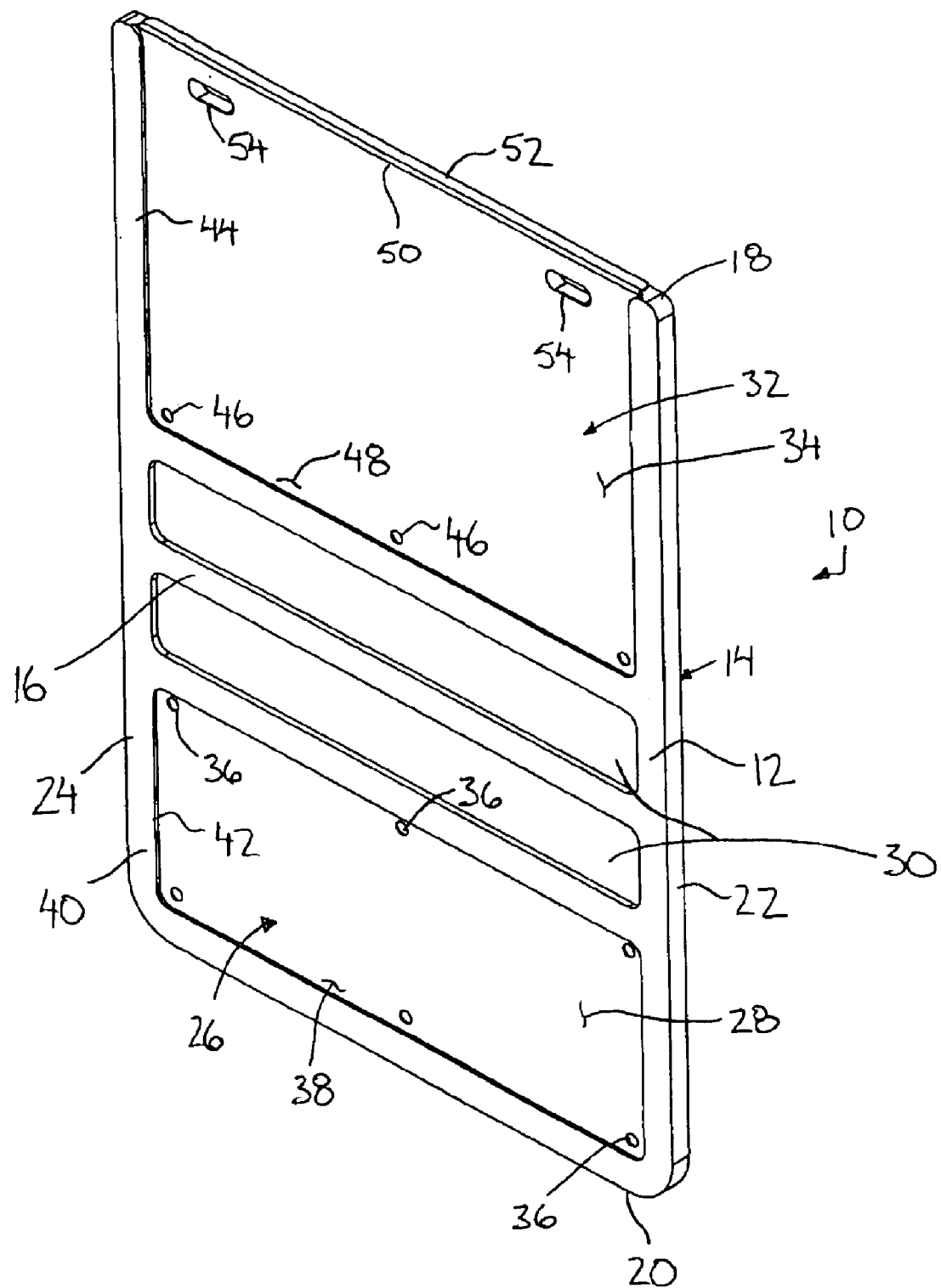
FIG. 1 is a isometric view of a first embodiment of the mud flap.
Figure 4:
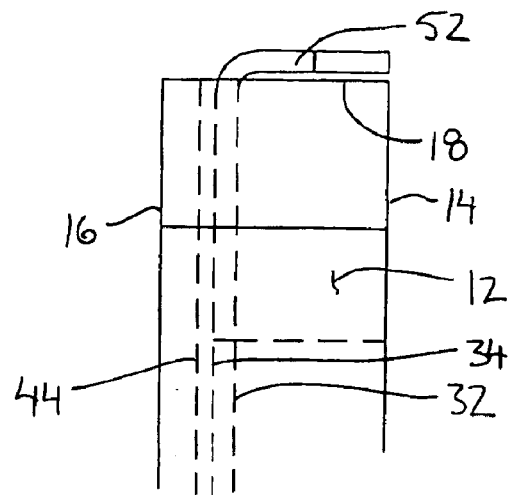
FIG. 4 is an enlarged side elevational view of the top end of the mud flap as viewed in FIG. 3.

Referring to the accompanying drawings, there is illustrated a mud flap generally indicated by reference numeral 10. The mud flap 10 is intended for mounting within the wheel well of a vehicle, rearwardly of the respective wheel of the vehicle as in conventional mud flaps. As various embodiments of the present invention are described and illustrated herein, the common elements will first be described.

The mud flap includes a panel 12 of somewhat resilient rubber material which forms the main body of the mud flap.

The panel includes a front surface 14 and a rear surface 16. The front and rear surfaces are bound by a top mounting end 18, a bottom free end 20, an inner side 22 and an outer side 24 in which the inner and outer sides extend in a longitudinal direction of the panel member between the top and bottom ends thereof. Although each embodiment is described as a left sided model, the corresponding right sided model is either identical to or a mirror image of the left sided model construction.

The panel member 12 includes a lower recessed portion 26 adjacent the bottom free end 20 for receiving an accent plate 28 therein. Two middle recessed portions 30 are also provided spaced between the ends of the panel member. An upper recessed portion 32 is provided adjacent the top mounting end of the panel member for receiving a mounting plate 34 therein.

Each recessed portion generally comprises an area in the rear surface 16 of the panel member which is recessed in relation to a surrounding periphery of the body of the panel member 12 so that thickness of the panel member at each recessed portion is reduced. The shape of the area of each recessed portion is generally rectangular with rounded corners.

The accent plate 28 is formed of a rigid metallic plate of stainless steel which is thinner than the depth of the lower recessed portion 26 within which it is received so that the outer surface of the accent plate is recessed in relation to the surrounding peripheral surface of the body of the panel member in a mounted position. The accent plate is also generally rectangular, having a shape which is substantially identical to the respective lower recessed portion 26, yet the accent plate is sized to be slightly smaller than the dimensions at the periphery of the recessed portion 26 so that a spacing in the order of 1/16 of an inch to 1/32 of an inch is provided about a full periphery of the accent plate when mounted within the respective recessed portion.

Apertures 36 are provided at the corners of the accent plate and at spaced positions along the top and bottom sides so that each aperture 36 is located adjacent a peripheral edge 38 of the accent plate while being spaced slightly inwardly from the edge of the accent plate and the corresponding edge of the lower recessed portion 26. The apertures 36 are in alignment with corresponding apertures in the panel member which extend fully through the panel member at the lower recessed portion adjacent a periphery thereof for receiving fasteners through the corresponding apertures to secure the accent plate to the panel member. The fasteners are formed of a similar grade of stainless steel as the accent plate to prevent corrosion therebetween.

A peripheral lip 40 is formed integrally with the panel member 12 of a stretchable rubber material, like the main body. The peripheral lip 40 projects inwardly about a full periphery of the lower recessed portion 26, flush with a peripheral outer rear surface of the body of the panel member. The lip projects parallel and spaced outwardly from the recessed surface of the lower recessed portion 26 of the panel member for receiving the peripheral edge 38 of the accent plate between the lip and the recessed floor surface of the portion 26. The lip may project inwardly in the order of 1/8 of an inch to 5/16 of an inch, but ideally the lip projects inwardly in the order of 3/16 of an inch so as to overlap the peripheral edge of the accent plate about a full periphery thereof in the order of 1/8 of an inch to 1/16 of an inch. By overlapping the peripheral lip about the full circumference of the accent plate, the circumference at the free end 42 of the lip is arranged to be smaller than an outer circumference of the accent plate so that the lip is required to be stretched in order to receive the accent plate within the lower recessed portion 26. Providing a plate having dimensions which are slightly smaller than the interior dimensions of the lower recessed portion with the lip removed assists in insertion of the plate within the respective lower recessed portions. The apertures 36 and corresponding fasteners received therein are arranged to be spaced slightly inwardly from the free ends 42 of the peripheral lip 40 so as not to interfere with snug engagement of the peripheral lip with the outer surface of the accent plate at a point of overlap.

The mounting plate 34 also comprises a rigid stainless steel plate which is thinner than a depth of the corresponding upper recessed portion 32 so as to be recessed in relation to the surrounding rear surface of the body of the panel member in a mounted position. A peripheral lip 44 is provided which is configured similarly to the peripheral lip 40 of the accent plate for overlapping the peripheral edges of the mounting plate on at least three sides thereof. In the preferred embodiments disclosed herein, the peripheral lip 44 overlaps the body edge and both side edges as described above with regard to the lip of the accent plate. Apertures 46 are similarly provided in the bottom corners of the mounting plate and at spaced positions therebetween along the bottom edge, adjacent the edge but spaced slightly inwardly from the peripheral lip 44 while being formed of a similar grade of stainless steel to prevent corrosion.

A portion of the peripheral edge 48 of the mounting plate along the top edge 50 includes a flange portion 52 which projects forwardly from a portion of the top edge of a main body of the mounting plate 34 for overlapping the top edge of the panel member 12. The flange portion 52 lies perpendicularly to the main body of the mounting plate, while being integrally formed with the main body of the mounting plate so that the flange portion and the main body are joined by a bend in the sheeted material forming the mounting plate. At least a portion of the upper recessed portion 32 is open in relation to the top end of the panel member so that the opening in the upper recessed portion having no peripheral lip 44 receives the flange portion 52 therethrough. The flange portion 52 is arranged to be flush with the front surface of the panel member at the free end thereof such that the depth of the flange portion is substantially equal to the thickness of the panel member at the upper recessed portion 32.

Turning now to FIGS. 1 through 4 the first embodiment will now be described in further detail. In the first embodiment, the panel member 12 is generally rectangular, having a square top mounting end 18 so that the mounting plate 34 is similarly rectangular in shape. A pair of mounting slots 54 are provided at spaced positions along the top mounting end of the panel. Each mounting slot is elongate in a lateral direction extending across the top mounting end of the panel member. The mounting slots are spaced laterally from one another so as to be positioned adjacent the upper corners of the mounting plate and panel members. The mounting plate is arranged to have dimensions which are similar to that of the respective upper recessed portion 32 so that tolerance of a spacing between the peripheral edges of the plate and that of the recess are reduced in relation to that of the accent plate 28. The upper recessed portion 32 is open along the full top edge thereof so that the lip extends fully about only the bottom edge and side edges of the mounting plate. In this arrangement the mounting plate may be slidably received through the open top end of the upper recessed portion 32 in a longitudinal direction of the panel member. Accordingly the flange portion 52 extends across the full top edge of the panel member to abut the top edge of the panel member in a mounted position while the bottom end of the mounting plate abuts the bottom end of the upper recessed portion 32 when the apertures 46 in the mounting plate and corresponding apertures in the panel member are aligned for receiving fasteners therethrough.

Figure 6:
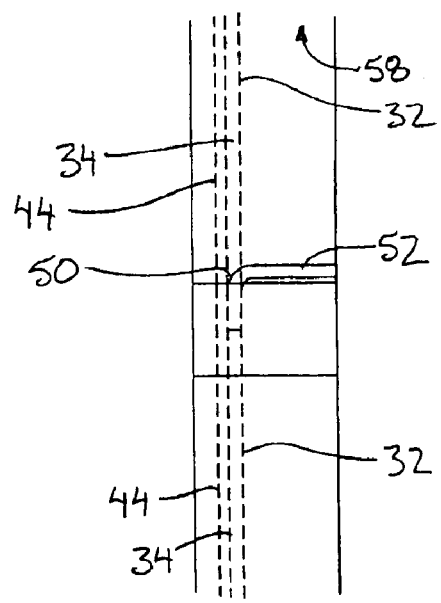
FIG. 6 is a side elevational view of a middle portion of the second embodiment according to FIG. 5.
Figure 5:
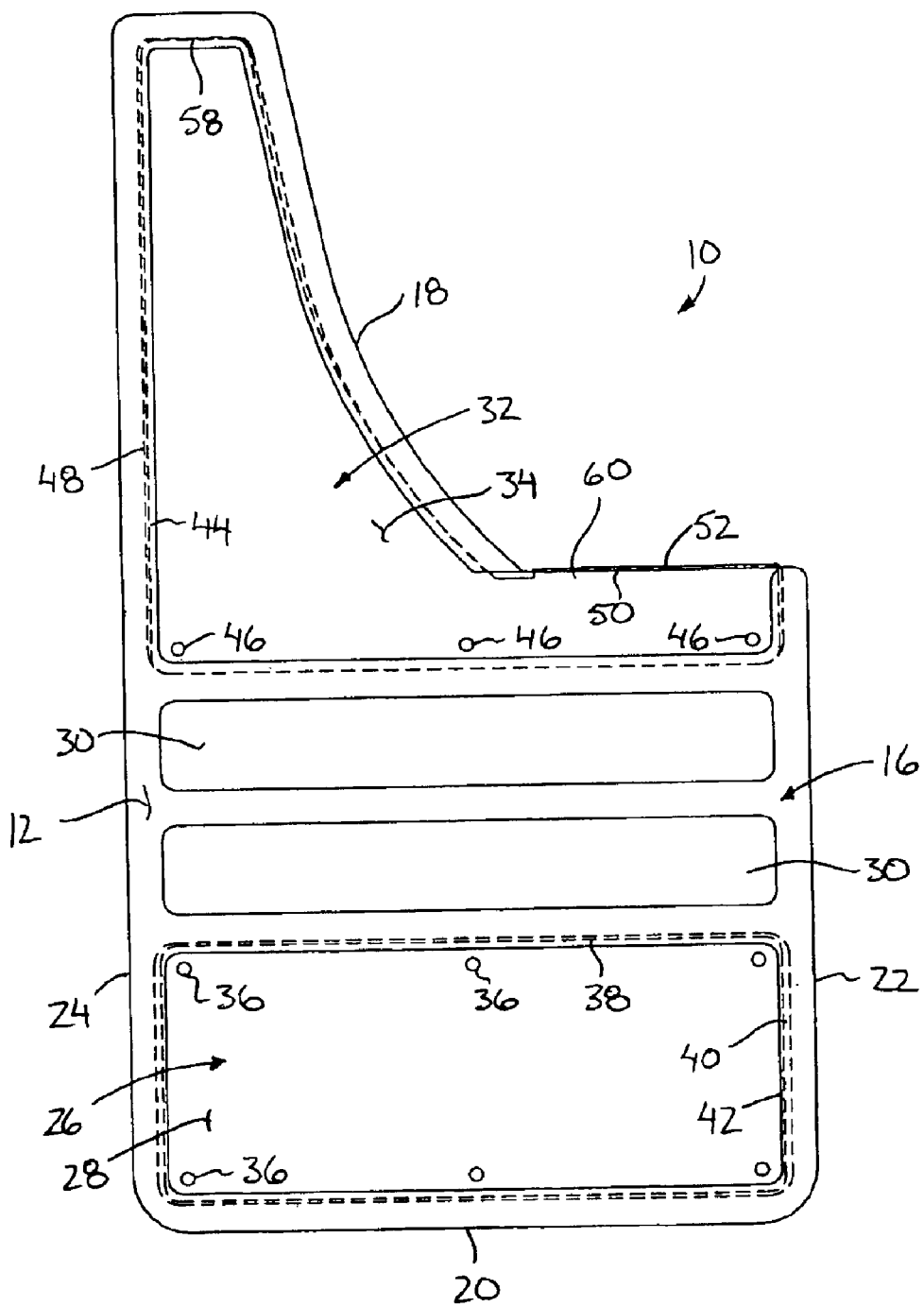
FIG. 5 is a front elevational view of a second embodiment of the mud flap.

Turning now to the embodiments of FIGS. 5 and 6, the top edge of the panel member 12 is suitably shaped for conforming to the shape of a particular wheel well of a vehicle. In this configuration the top edge of the panel is taller at an upper portion 58 adjacent the outer side of the panel member. The top edge subsequently curves downwardly along a curved portion toward the bottom end of the panel member as it extends in a lateral direction towards a lower portion 60 of the top edge adjacent an inner side of the panel member which is closer to the bottom end than the upper portion 58. The upper recessed portion 32 is located directly adjacent the top edge of the panel member and is similar in contour to the top edge as in previous embodiments. The mounting plate 34 is also identical in shape to the upper recessed portion 32 and the contour of the top edge of the panel member. The peripheral lip 44 in this instance overlaps the bottom edge and both side edges of the mounting plate as in previous embodiments, however the peripheral lip continues to extend about the upper portion 58 and the curved portion of the top edge extending towards the lower portion 60. The lower portion 60 remains open along the top edge but is filled with the flange portion 52 of the mounting plate so that all edges of the mounting plate either include a flange portion 52 or are overlapped by the peripheral lip 44. The flange 52 is similarly arranged to project forwardly from the top edge of the mounting plate to overlap the top edge of the panel member at the lower portion 60 thereof.

Figure 7:
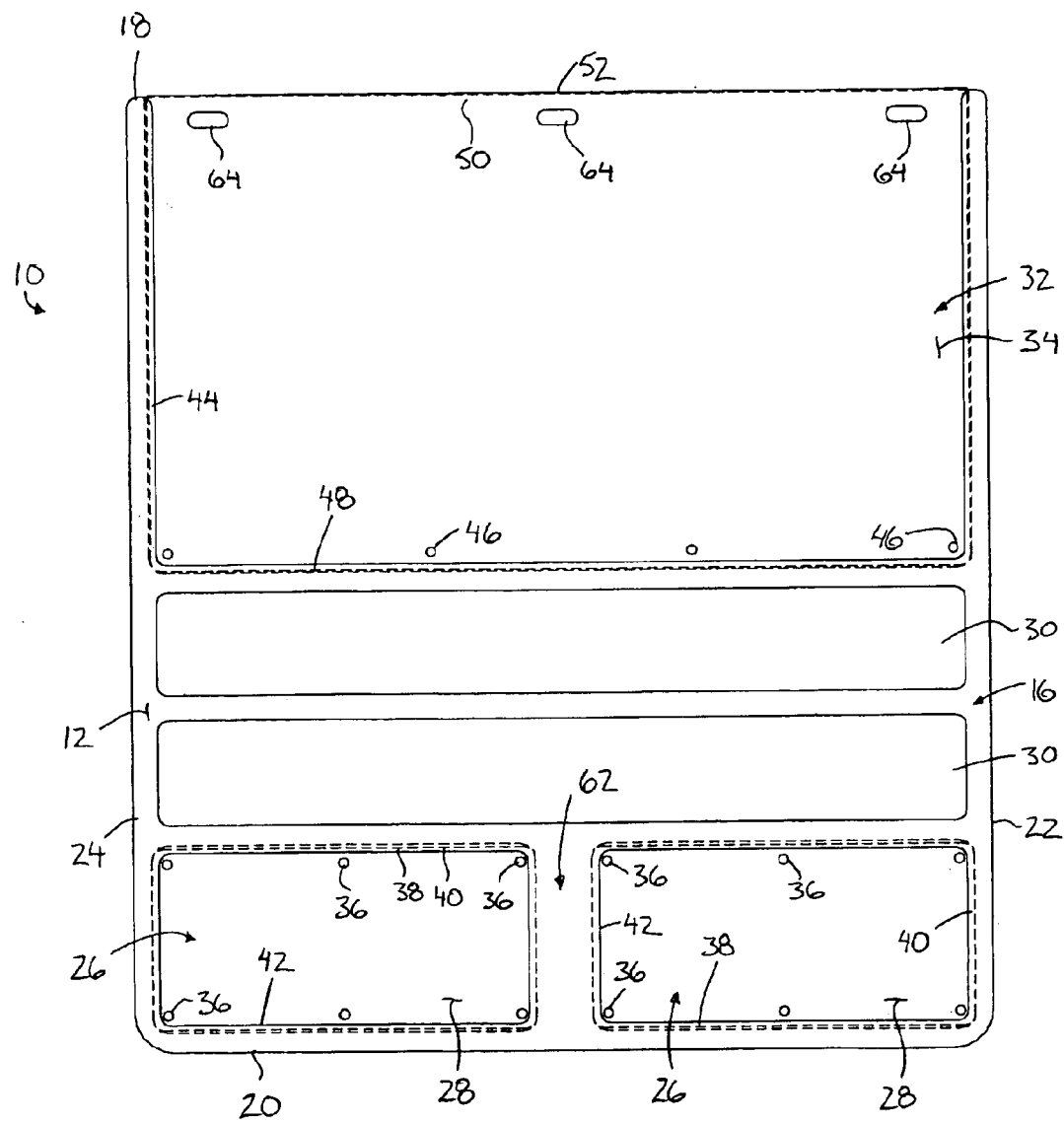
FIGS. 7 and 8 are front elevational views of respective third and fourth embodiments of the mud flap.

Turning now to FIG. 7 a further embodiment of the mud flap 10 is illustrated for use with a wheel well of a vehicle housing a dual wheel set. The panel member is accordingly wider than in the first embodiment, but otherwise the mounting plate is similarly configured to that of the first embodiment, being generally rectangular in shape.

The single accent plate of the first embodiment however is replaced with a pair of accent plates 28 which are laterally spaced from one another on opposing sides of a flexible central portion 62 which is arranged for alignment with a seam between the wheels of the dual wheel set. The individual accent plates 28 however are each arranged as in the first embodiment so as to be overlapped about a full periphery thereof by the peripheral lip 40. The accent plates 28 are again arranged to be smaller in dimension than the respective lower recessed portion 26 within which it is received while being slightly larger in outer circumference than the peripheral lip 40 at the free end thereof such that the peripheral lip must be stretched to receive the plate therein. Fasteners are similarly provided at the corners of each plate 28 and spaced along respective edges of the plate so that all fasteners are adjacent the edges but spaced slightly inwardly from the free end of the peripheral lip.

As noted above, the mounting plate 34 in the embodiment of FIG. 7 is similarly arranged as in the first embodiment so as to be generally rectangular in shape and includes the flange 52 extending along the full top end of the panel member to overlap the top edge of the panel member while the other three sides of the mounting plate are overlapped by the peripheral lip of the upper recessed portion 32. Three mounting slots 64 are provided at laterally spaced positions along the top edge of the mounting plate so as to be generally elongate and parallel to the top edge while being spaced slightly therefrom. A set of fasteners are provided at spaced positions along the bottom edge of the mounting plate as in all embodiments so as to be located adjacent the bottom edge of the mounting plate but spaced slightly inwardly from the peripheral lip overlapping the edge.

Figure 8:
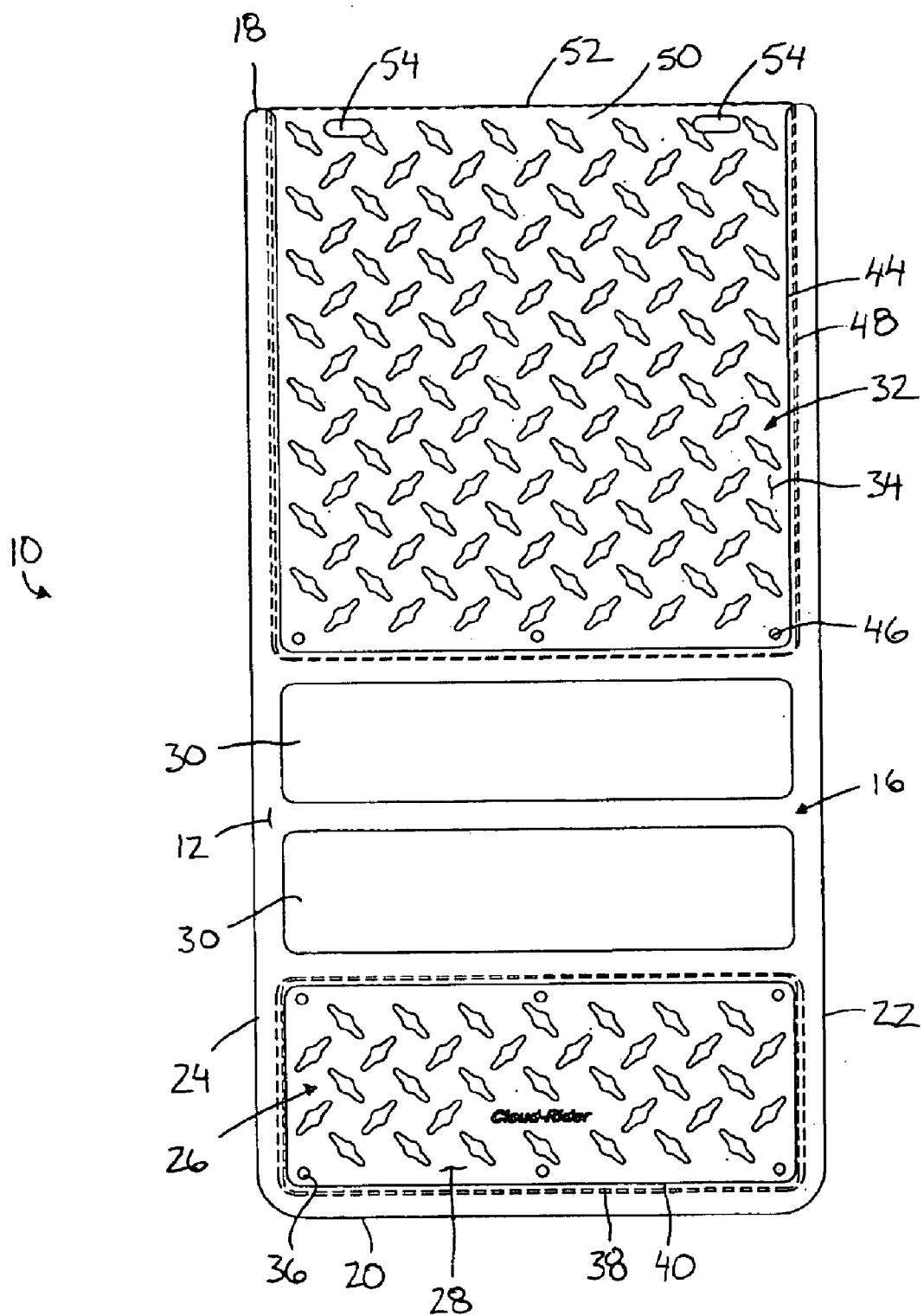

A further embodiment of the mud flap 10 is illustrated in FIG. 8 in which the mud flap is substantially identical to that of the first embodiment with the exception of being lengthened in the longitudinal directional for a different particular application. Also the accent plates, which are smooth in texture as illustrated in all previous embodiments, are provided with a conventional textured checker plate pattern which is interchangeable in any embodiment of the mud flap with the smooth accent plates and mounting plates for either strength or appearance as desired.

In further embodiments the accent plates or mounting plate may include ribs or formations therein for added strength to resist bending. For additional securement of the mounting plate to the top end of the panel member, the flange portion 52 may be provided with an additional bend adjacent the free end thereof such that the free end of the flange portion terminates at a downward turned end overlapping the opposing front surface 14 of the mud flap. For additional securement various combinations of fasteners and/or adhesive compound between the panel member and the mounting plate or accent plates may be provided. In all embodiments the use of a peripheral lip which overlaps at least a portion of the edges of the plates received within the panel member, assists in securing the edges of the plates securely to the panel member to prevent separation thereof which would otherwise cause debris to enter between the plates and the panel member to cause subsequent deformation and undesirable appearance to the mud flap.

While various embodiments of the present invention have been described in the foregoing, it is to be understood that other embodiments are possible within the scope of the invention. The invention is to be considered limited solely by the scope of the appended claims.

What is claimed is:

1. A mud flap for a vehicle comprising:
 a panel member having front and rear surfaces bounded by a top mounting end, a bottom free end and respective inner and outer sides extending between the ends, the rear surface including a recessed portion therein;
 mounting means for securing the top mounting end of the panel member to the vehicle; and
 a metallic accent plate received within the recessed portion of the rear surface of the panel member; and
 a plurality of fasteners securing the accent plate to the panel member at spaced positions about a periphery of the accent plate;
 the recessed portion including a peripheral lip which extends about a periphery of the recessed portion and which overlaps a peripheral edge of the accent plate; and
 the fasteners being located adjacent the peripheral edge of the accent plate, spaced inwardly from the overlapping peripheral lip.

2. The mud flap according to claim 1 wherein the peripheral lip is formed of stretchable resilient material.

3. The mud flap according to claim 1 wherein the peripheral lip projects inwardly from the periphery of the recessed portion a distance between $\frac{1}{8}$ of an inch and $\frac{5}{16}$ of an inch.

4. The mud flap according to claim 1 wherein the recessed portion is located adjacent the bottom end of the panel member.

5. The mud flap according to claim 1 wherein the accent plate is smaller in dimension than the recessed portion such that the peripheral edge of the accent plate is spaced inwardly from the periphery of the recessed portion.

6. The mud flap according to claim 1 wherein the fasteners and the accent plate are formed of a similar grade of stainless steel.

7. The mud flap according to claim 1 wherein the mounting means comprises a pair of elongated slots in the panel member adjacent the top mounting end of the panel member.

8. The mud flap according to claim 1 wherein there is provided a pair of metallic accent plates spaced apart along the bottom free end of the panel member, each supported within a respective recessed portion of the panel member and each being overlapped by a respective peripheral lip of the recessed portion.

9. The mud flap according to claim 1 wherein the panel member includes a mounting portion recessed into the rear surface adjacent the top mounting end which receives a mounting plate therein.

10. The mud flap according to claim 9 wherein the mounting portion includes a peripheral lip which extends at least partway about a periphery of the mounting portion and which overlaps a peripheral edge of the mounting plate.

11. A mud flap for a vehicle comprising:
  a panel member having front and rear surfaces bounded by a top mounting end, a bottom free end and respective inner and outer sides extending between the ends, the rear surface including a mounting portion recessed therein adjacent the top mounting end and a lower recessed portion therein;
  mounting means for securing the top mounting end of the panel member to the vehicle including a mounting plate received in the mounting portion of the panel member having mounting apertures therein;
  the mounting portion of the panel member including a peripheral lip which extends at least partway about a periphery of the mounting portion and which overlaps a peripheral edge of the mounting plate;
  a metallic accent plate received within the lower recessed portion of the rear surface of the panel member;
  the lower recessed portion of the panel member including a peripheral lip which extends at least partway about a periphery of the recessed portion and which overlaps peripheral edge of the accent plate;
  wherein the mounting portion is open along the top mounting end of the panel member for slidably receiving the mounting plate into the mounting portion of the panel member in a longitudinal direction of the panel member.

12. The mud flap according to claim 11 wherein the peripheral lip extends fully about the periphery of the recessed portion and overlaps the edge of the accent plate about a full periphery of the accent plate.

13. The mud flap according to claim 11 wherein the mounting portion extends up to the top mounting end, the mounting plate including a flange portion extending rearwardly from a top edge of a main body of the mounting plate and overlapping the top mounting end of the panel member.

14. The mud flap according to claim 13 wherein the flange portion lies generally perpendicularly to the main body of the mounting plate.

15. A mud flap for a vehicle comprising:
  a panel member having front and rear surfaces bounded by a top mounting end, a bottom free end and respective inner and outer sides extending between the ends, the rear surface including an upper recessed portion recessed therein adjacent the top mounting end and a lower recessed portion recessed therein adjacent a bottom end;
  mounting means for securing the top mounting end of the panel member to the vehicle including a mounting plate received in the upper recessed portion of the panel member having mounting apertures therein;
  upper recessed portion of the panel member including a peripheral lip which extends at least partway about a periphery of the upper recessed portion and which overlaps a bottom peripheral edge end both side peripheral edges of the mounting plate;
  the mounting plate and the upper recessed portion being similarly contoured along the top end of the panel member;
  a metallic accent plate received within the lower recessed portion of the rear surface of the panel member; and
  the lower recessed portion of the panel member including a peripheral lip which extends at least partway about a periphery of the recessed portion and which overlaps a peripheral edge of the accent plate.

16. The mud flap according to claim 15 wherein the upper recessed portion extends up to the top mounting end, the mounting plate including a flange portion extending rearwardly from a top edge of a main body of the mounting plate and overlapping the top mounting end of the panel member.

17. The mud flap according to claim 15 wherein the peripheral lip of the upper recessed portion overlaps a portion of a top peripheral edge of the mounting plate.

\* \* \* \* \*